3,218,190
METHOD OF PREPARING REENFORCED SYNTHETIC RESINOUS ARTICLES AND CATALYST IMPREGNATED REENFORCING MATRIX THEREFOR
James A. Patterson, Atherton, and Glenn K. Lissner, Los Altos, Calif., assignors, by mesne assignments, to Diamond Alkali Company, Cleveland, Ohio, a corporation of Delaware
Filed July 5, 1955, Ser. No. 520,137
7 Claims. (Cl. 117—72)

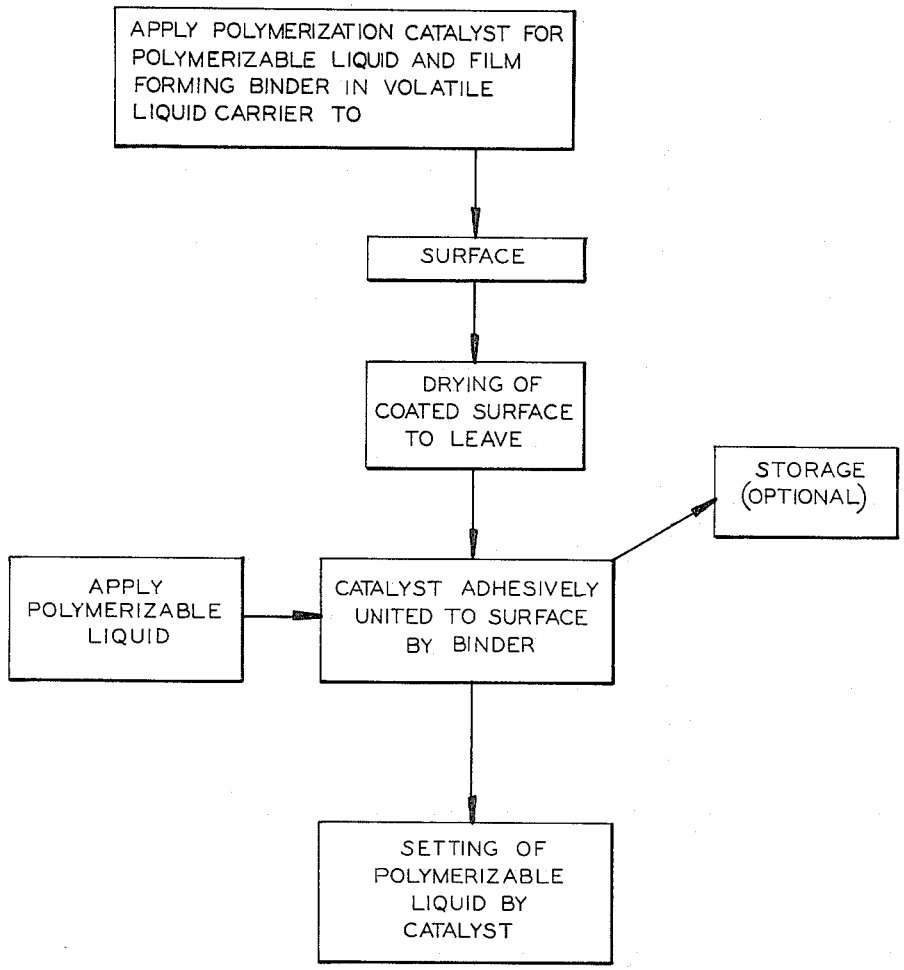
INVENTORS
JAMES A. PATTERSON
GLENN K. LISSNER

This invention relates to the preparation of a synthetic resinous article that is reenforced with a usual matrix, or in other words supporting surface; and more particularly to the preparation of such a resinous article by first impregnating a sheet-type matrix with a polymerization catalyst, and then applying a liquid polymerizable material to the matrix. In its most advantageous embodiment, the sheet-type matrix as employed herein is a porous or cellular flexible mat-like structure, such as woven cloth fabric, woven fiber glass cloth, or felted fiber glass mat. The sheets may be formed in flat, cylindrical, or any other suitable shape for preparing reenforced resinous articles of such shape.

Solid synthetic resinous articles, commonly called plastics, are frequently reenforced with a sheet-type matrix because of the high degree of a strength obtained by incorporating such a matrix in the resinous articles. In the preparation of such reenforced resinous articles by conventional procedure, a polymerization catalyst is mixed with the liquid polymerizable material immediately prior to formation of the article; and the catalyzed polymerizable material is then applied to the sheet-type matrix by any conventional means, such as by pouring, dipping, brushing or spraying.

After the catalyst has been mixed with a liquid polymerizable material, the working life or "pot life" of the polymerizable material ranges from a minimum of a few minutes to several hours, depending upon various factors, such as the type and composition of the liquid polymerizable material, the temperature, and the type and amount of catalyst employed. Consequently, in the conventional procedure all of the catalyzed liquid polymerizable material must be applied to the sheet-type reenforcing matrix within a short period, since any remaining unusued polymerizable material becomes polymerized to a solid unusable mass. As a result, the catalyzed liquid polymerizable material can not be stored for any appreciable period, and only a limited amount of polymerizable material may be mixed with a catalyst at any one time. Consequently, new batches of catalyzed liquid polymerizable material must be prepared at relatively short intervals when such reenforced synthetic resinous articles are prepared by conventional procedure.

To summarize this invention, a reenforced synthetic resinous article is prepared by impregnating a matrix with a polymerization catalyst, and then applying a liquid polymerizable material to the catalyst impregnated matrix. Although the polymerization catalyst may be applied directly to the sheet-type matrix or it may be uniformly distributed in a volatile liquid and then applied to the matrix, best results are obtained with the catalyst applied to the sheet-type matrix when the catalyst is uniformly distributed in a volatile liquid carrier together with a solid, film forming binder that is soluble in the liquid polymerizable material. When a volatile liquid carrier containing the binder and catalyst is applied to the sheet-type matrix, the volatile liquid evaporates and leaves a deposit of catalyst and binder on the sheet-type matrix. The liquid polymerizable material is then applied to the sheet-type matrix, which advantageously is a porous sheet-type matrix of the character previously related. This application of the liquid polymerizable material causes the binder to become automatically dissolved by the polymerizable material, and thereby renders the catalyst effective to cause polymerization of the liquid polymerizable material in situ on the matrix and thus form the reenforced synthetic resinous article.

The sheet-type matrix impregnated with a catalyst in accordance with this invention may be stored for relatively long periods of time before the polymerizable material is applied, and the liquid polymerizable material can be subsequently applied whenever desired. Consequently, the burdensome customary procedure of preparing limited batches of catalyzed polymerizable material that have a relatively short working life is avoided. The use of a volatile liquid containing the catalyst uniformly distributed therein, either in solution or as a dispersion, provides an even distribution of catalyst throughout the sheet-type matrix, and thereby produces uniform polymerization of the liquid polymerizable material. Furthermore, when the catalyst is carried by a volatile liquid, the catalyst becomes uniformly impregnated on the surface of the sheet-type matrix and also in the interstices thereof, rather than on the outside surface alone. Consquently, the catalyst tends to remain on the matrix when the matrix is moved or disturbed.

The use of volatile liquid carrier containing a catalyst and a binder which is both film forming on the matrix and soluble in the liquid polymerizable material, provides important advantages in the preparation of reenforced synthetic resinous articles. The carrier evaporates to effect deposit on the matrix of a solid coating film of the binder which adhesively unites the catalyst to the matrix and protects the catalyst. As a result, the adherence of the catalyst to the matrix is materially enhanced when the matrix is moved in any way, such as in handling for purposes of storing the catalyst impregnated matrix or upon application of liquid polymerizable material to the matrix. Loss of catalyst from the matrix is undesirable since it results in uneven or spotty polymerization and products an unsatisfactory product.

Furthermore, the described type of binder serves as a protective agent in stabilizing unstable catalysts, such as the organic peroxides, that normally decompose at room temperature because the film formed thereby prevents exposure of the catalyst to agent that cause decomposition. This is another important factor is permitting the catalyst impregnated matrix to be stored for substantial periods before it is used. In addition the film forming binder serves to immobilize liquid catalysts that would otherwise render the sheet type matrix moist and unsuitable for storage and handling.

The accompanying single sheet of drawing depicts a flow sheet of the process hereof.

As illustrated, a polymerization catalyst for a polymerizable liquid and a film forming binder in a volatile liquid carrier are applied to a surface. After drying of the coated surface, the catalyst becomes adhesively united or bonded to such surface by the set binder. Upon subsequent application of the polymerizable liquid to the surface, it is set or cured by the catalyst. As an optional step, before applying the polymerizable liquid, the product on which the catalyst is adhesively bonded by the binder may be stored for future application of the polymerizable liquid. Then at a later time, the polymerizable liquid may be applied thereto.

In greater detail, any of the well-known liquid polymerizable materials that can be polymerized to a solid, relatively hard material by a polymerization catalyst may be employed to form the reenforced synthetic resinous article of this invention. Polyesters, epoxy resins, phenolics and melamine resins are examples of such liquid polymerizable materials.

The most useful liquid polymerizable materials for forming reenforced synthetic resinous articles in accordance with this invention are commonly called polyesters. These polyesters comprise mixtures of unsaturated alkyd resin having a plurality of alpha-beta ethylenically unsaturated groups; and an ethylenically unsaturated monomer, which is hereinafter designated as monomer. Such liquid polyester mixtures are well known and the components and preparation of the mixtures are described in United States Letters Patent Nos. 2,632,751, 2,646,416, 2,652,383, and many others.

In the preparation of such liquid polymerizable polyesters, alkyd resins having a plurality of polymerizable alpha-beta ethylenically unsaturated groups may be prepared by reacting together polyhydric alcohols with polycarboxylic acids or acid anhydrides containing alpha-beta ethylenic unsaturation. Examples of suitable ethylenically unsaturated dicarboxylic acids that may be employed are maleic acid, fumaric acid, itaconic acid, citraconic acid, and mesaconic acids wells the other acids mentioned in the foregoing patents.

Typical dihydric alcohols that may be employed for preparing such alkyd resins include alkylene glycols as typified by ethylene glycol, propylene glycols, butylene glycols and hexylene glycols. Condensed glycols such as diethylene glycol, dipropylene glycol and dibutylene glycol are also useful, as well as any of the glycols referred to in the previously mentioned patents. As described in the aforementioned patents, unsaturated alkyd resins of the character described are generally prepared in a well known manner by reacting polycarboxylic acids or anhydrides of the character described with polyhydric alcohols at elevated temperatures in the presence of an inert atmosphere.

Ethylenically unsaturated monomers are intermixed with the foregoing unsaturated alkyd resins to form solutions of polymerizable liquid polyesters, which may be utilized in accordance with this invention. Such unsaturated monomers are well known, and they are described and enumerated in the previously mentioned patents. Any polymerizable monomer containing one or more ethylenic double bonds per molecule may be employed. Examples of such monomers are styrene, vinyl toluene, dimethyl styrene, acrylonitrile, methyl acrylate, methyl methacrylate, vinyl acetate, ethyl crotonate, vinyl benzoate, divinyl benzene, trivinyl benzene, butadiene, vinyl acrylate, allyl acrylate, ethylene glycol dimethacrylate, diallyl phthalate, dially fumarate, glyceryl trimethacrylate and triallyl cyanurate as we as the monomers listed in the foregoing patents. Styrene is the monomer most commonly employed for mixing with an alkyd resin to form a liquid polyester. The resultant liquid polymerizable polyester is particularly useful for the preparation of a reenforced synthetic resinous article in accordance with this invention.

Other suitable liquid polymerizable materials that may be employed for the preparation of a reenforced synthetic resinous article with a catalyst impregnated sheet-type matrix include the well known epoxy resins. Such resins are condensates of epichlorohydrin and bisphenol, and they are available commercially in the form of polymerizable liquids of varying viscosity. Shell Chemical Company sells such epoxy resins under the trademark "Epon." The readily available phenolic resins, such as phenol-formaldehyde resins, may also be used in solution or liquid form in accordance with this invention. Likewise, melamine resins, such as melamine-formaldehyde, provide another example of a liquid polymerizable material that is readily polymerized by a polymerization catalyst, and which may be employed for preparation of reenforced resinous articles. If desired, additives that are inert to the liquid polymerizable material may be mixed with the polymerizable material long before it is used, and the material can be stored until ready for use. Examples of such additives are fillers, pigments, and accelerators such as cobalt naphthenate.

Catalysts that may be employed for polymerizing the liquid polymerizable materials in accordance with this invention are well known. Solid catalysts are preferred, but liquid catalysts that are advantageously immobilized by a binder may also be utilized. Suitable catalysts for liquid polyester polymerizable materials are readily available, and the most useful of such catalysts are the organic peroxides or per compounds. Such catalysts include benzoyl peroxide, lauroyl peroxide, cumene hydroperoxide, acetyl peroxide, methyl ethyl ketone peroxide, as well as other peroxide catalysts commonly employed in vinyl type polymerizations. Although oxygen type catalysts are preferred, other types of catalysts for polyester polymerization, such as acids or azo compounds, may be used. For example, hydrochloric acid, and sulfuric acid are suitable acid catalysts; and azo butyryl nitrile is an example of an azo catalyst useful for polymerizing polyesters.

Polymerization of liquid epoxy resins, phenolics or melamines may also be effected by any well known polymerization catalyst for such resins. Liquid epoxy compounds are generally polymerized by amine type catalysts, such as tetraethylene pentamine and diethylenetriamine. As is well known, acid type or base type catalysts are commonly employed for the polymerization of phenolic resins, and also for the polymerization of melamine resins. Examples of suitable acid type catalysts are hydrochloric acid and sulfuric acid. Base type catalysts that are useful for effecting polymerization of liquid phenolics and melamines are soduim hydroxide and sodium carbonate.

Any sheet-type matrix commonly employed to reenforce a polymerized resin or provide a decorative effect with such resin may be impregnated with a polymerization catalyst in accordance with this invention. The sheet-type matrix may be flat, cylindrical or in any desired shape in order to provide a reenforced synthetic resinous article of such shape. Fabrics made from glass fibers, such as flexible porous glass cloth and glass mat, have found wide spread use as reenforcing matrices for such resins because of the high strength to weight ratio provided. Other types of matrices have also been employed, such as woven or felted burlap, synthetic fabrics, and printed cloth. Readily flexible or even relatively inflexible metal wire screens are also useful as reenforcing matrices, and even metallic honeycomb structures, such as those made from aluminum, may be employed for reenforcing synthetic resinous articles. In some cases, combinations of the foregoing sheet-type matrices are employed.

As previously mentioned, in accordance with this invention, the catalyst is preferably applied to the sheet-type matrix by uniformly distributing the catalyst in a volatile liquid carrier. After application to the matrix, the volatile liquid carrier evaporates and the catalyst is deposited on the matrix. Any volatile liquid that does not chemically react with the catalyst may be employed. The volatile liquid carrier may contain the catalyst as a solid dispersed in the liquid carrier, or as the dispersed phase in an emulsion when the catalyst is a liquid that is insoluble in the carrier. However, the catalyst is preferably dissolved in the volatile liquid carrier to form a solution since a solution is easy to prepare and it assures that the catalyst will be uniformly distributed.

Suitable volatile liquid carriers that dissolve the various catalysts are readily selected on the basis of the well known solubility of such catalysts in various liquids. For example, organic peroxide catalysts are very soluble in chloroform, methylene chloride, ethylene dichloride, or trichloroethylene, which are all suitable volatile liquid carriers. Also, acetone, benzene carbon tetrachloride, carbon disulfide, ethylether, esters, or toluene may be employed as the volatile liquid carrier for dissolving organic peroxide catalysts. Examples of volatile liquid carriers that dissolve amine catalysts include ethyl and methyl alcohol, liquid ketones, and water. With water soluble catalysts, such as the previously mentioned acid or base catalysts, water is preferably employed as the volatile liquid carrier to form a solution of the catalyst in water.

If an emulsion or dispersion of the catalyst in a volatile liquid carrier is employed for a catalyst that is not soluble in the carrier, any well known dispersing agent is added to the mixture. The dispersing agent may also function as a film forming binder. For example, with dispersions or emulsions of organic peroxide catalysts in liquid carriers such as water or ethyl alcohol, dispersing agents such as carboxymethyl cellulose or polyvinyl alcohol, which also serve as binders, may be utilized. Examples of other suitable dispersing agents that function as dispersing agents alone and not also as binders are the lignin sulfonic acids and polyalkylene oxides.

For obtaining the advantages previously related, a film forming binder that is soluble in the liquid polymerizable material is advantageously distributed in the volatile liquid carrier along with the catalyst. When the volatile liquid carriers evaporates after it has been applied to the sheet-type matrix, the resultant solid film of binder holds the catalyst on the matrix, and acts to prevent catalyst from falling off the matrix when the matrix is moved. Furthermore, many catalysts are unstable when exposed to the air or to vapors that frequently accumulate in storage spaces. For example peroxide catalysts used for polymerizing polyesters tend to decompose, and acid or base catalysts are neutralized, respectively, by basic or acidic vapors. With liquid peroxide, catalysts, such as methyl ethyl ketone peroxide, a binder is particularly advantageous since such catalysts are very volatile and rapidly decompose. The catalyst is protected from the surrounding atmosphere by the binder. Consequently, the matrix impregnated with the catalyst may be stored for substantial periods of time without substantial evaporation or deterioration of catalyst.

The binder is selected for its physical properties. As previously related, a solid, film-forming binder is employed that is soluble in the particular liquid polymerizable material which is applied to the matrix to form the reenforced synthetic resinous article. In other words the liquid polymerizable material is a solvent for the particular binder that is employed. The film forming property of the binder enables the binder to immobilize and protect the catalyst on the matrix, and solubility of the binder in the liquid polymerizable material enables such material to dissolve the binder and come into contact with the catalyst. The binder is also preferably soluble in the volatile liquid carrier so as to assure uniform distribution of binder on the matrix, and most of the film forming binders of the character described are soluble in the organic volatile liquid carriers. However, an emulsion of liquid binder in the volatile liquid carrier may be formed with any well known emulsifying agent. As is well known, soluble soaps such as sodium oleate, sodium stearate and calcium oleate; and detergents such as sodium lauryl sulfate, and sodium aryl or alkyl sulfates and sulfonates may be employed for forming an emulsion.

A binder that is in liquid form when applied to the matrix and which forms the desired solid protective film when applied to the sheet-type matrix is utilized. Furthermore, the binder and the catalyst are preferably miscible so that a single film of the binder and catalyst is formed on the sheet-type matrix. With this type of binder, either liquid or solid catalysts are readily immobilized on the matrix until the polymerizable material is applied and the binder is dissolved in such material. However, even when the binder and catalyst are not soluble in each other, the film forming liquid binder physically surrounds and retains the catalyst on the matrix, and thus such binders are also useful. Also, binders that do not react with the catalyst or inhibit polymerization are used.

Any film forming binder having the desired physical properties specified herein may be employed. In using liquid polymerizable materials that are polymerized in non aqueous media, such as polyesters and epoxy resins, binders that are soluble in such polymerizable materials are utilized. For example, polyester and epoxy resin liquid polymerizable materials are solvents for binders such as vinyl polymers, natural resins such as rosin, waxes such as vegetable waxes and paraffin waxes, and neutral gums. Water soluble binders are employed for materials polymerizable in aqueous media, such as liquid phenolic resins, urea-formaldehyde resins and melamine-formaldehyde resins. Examples of suitable water soluble film-forming binders are casein glues; water soluble polyvinyl compounds such as polyvinyl alcohol, polyvinyl pyridine and polyvinyl pyrollidone; starch; water soluble natural gums; and water soluble cellulosic derivatives such as carboxymethyl cellulose. Some materials may function as both a catalyst and a film forming binder. For example, polyvinyl pyridine forms a film that also serves as a catalyst for polymerizing epoxy resins and phenolic resins. Also, a polymer formed by condensing a phenolic resin with an amine may be used as a combined binder and catalyst for epoxy resins and phenolic resins.

The amount of any particular catalysts that may be employed to effect polymerization of any commonly used liquid polymerizable material is well known. For example, between 0.1 and 10 gms. of peroxide catalyst are employed to polymerize each 100 gms. of polyester resin, with from 0.5 to 5 gms. being preferred. This amount of catalyst may vary widely and still produce a satisfactory polymerized resin. Also, the amount of catalyst employed varies with the type of liquid polymerizable material. For example, liquid epoxy resins are preferably polymerized by employing from 15 to 40 gms. of catalyst for each 100 gms. of resin. A measured amount of catalyst is uniformly distributed in the volatile liquid carrier, and the amount of volatile liquid carrier applied to any given area of the matrix is then readily determined by the known concentration of catalyst and the amount of polymerizable material that is to be applied to the matrix. For example, a solution of 10 gms. of benzoyl peroxide in 100 cc. of benzene may be applied to an area of 500 square inches of sheet-type matrix to polymerize 500 gms. of liquid polymerizable polyester when it is placed in contact with the matrix. Under such conditions the liquid polyester is polymerized with 2 percent by weight of catalyst based on the weight of the polyester.

The amount of binder employed may vary widely as long as there is sufficient binder to form the desired film for retention of the catalyst. Generally, approximately the same weight or more of binder is employed in parts by weight as the amount of catalyst. A somewhat larger amount of binder is preferably employed when a liquid catalyst is to be immobilized. However, the quantity of binder is not critical, and a visual inspection is usually sufficient to determine if sufficient binder is present to form a film.

The impregnated sheet-type matrix is prepared by first mixing the catalyst and also most advantageously the binder, with the volatile liquid carrier until the catalyst and binder are uniformly distributed in the carrier. As previously related, a solution of catalyst and binder in the carrier is preferred, but emulsions or dispersions may be employed. The volatile liquid carrier containing the catalyst is then applied to the sheet-type matrix by any convenient means, such as by brushing, dipping or spraying. When the volatile liquid carrier evaporates, the catalyst is impregnated on the sheet-type matrix. The use of a binder of the character described uniformly distributed in the volatile carrier provides a film of binder on the matrix when the carrier evaporates. The binder immobilizes the catalyst, protects the catalyst from deterioration, and helps to maintain the catalyst on the sheet-type matrix. The catalyst-impregnated matrix may then be stored for considerable periods, such as for many months, before it is used.

In addition to the catalyst and binder, other polymerization aids or modifiers may also be impregnated in the matrix in the manner described. Also, inactive fillers or coloring matter can be deposited on the matrix if desired. Examples of polymerization aids are metallic compounds such as cobalt naphthenate and dibutyl tin dilaurate; and amines such as dimethyl aniline and tetraethylene-pent-amine. Well known modifiers or inhibitory compounds that may be impregnated on the matrix include lauryl mercaptan, quaternary ammonium compounds such as trimethyl benzyl ammonium chloride, and the usual protective agents such as light stabilizers. If the catalyst system is composed of mutually incompatible compounds, such as benzoyl peroxide catalyst and cobalt naphthenate metallic accelerator, such compounds may be incorporated in the matrix in different layers. A volatile liquid containing the binder and catalyst is applied as one coating to form a layer of catalyst and binder, and a carrier containing the accelerator and a binder is applied to form a different layer. If desired, the coating of accelerator and binder may be a single composition that performs the functions of both accelerator and binder. For example, a resinous condensate of phenol-formaldehyde and a polyethyleneamine may be employed as a binder and such a binder will also serve as an accelerator for polymerization of a liquid polyester catalyzed with an organic peroxide. Preferably, the volatile liquid carrier used for applying the second layer should be a poor solvent for the binder of the first layer so that the accelerator and catalyst will not come into contact with each other.

In order to form the reenforced synthetic resinous article from the catalyst impregnated sheet-type matrix, the liquid polymerizable material is applied to the matrix by any convenient means, such as by spraying, pouring, dipping, or brushing. A reenforced resinous article of any desired shape is obtained by shaping the sheet-type matrix into the desired form by any convenient means such as a mold, either before application of the polymerizable material or during application of such material. Reenforced resinous articles having a thickness of from one-eighth to one-quarter inch are commonly prepared by the method hereof. However, thinner reenforced resinous articles may also be formed.

The following are examples of the preparation of reenforced synthetic resinous articles in accordance with this invention:

*Example 1*

A solution of catalyst and binder in a volatile liquid carrier was prepared by stirring the following materials in a glass flask until a uniform liquid solution was formed, the polystyrene binder and benzoyl peroxide catalyst being dissolved in the methylene chloride carrier.

| | Gms. |
|---|---|
| Benzoyl peroxide (catalyst) | 5 |
| Polystyrene beads (solid polymerized styrene) (binder). The viscosity of a 30% test solution of the polystyrene in toluene at 25° C., measured by a Brookfield viscosimeter is 31 centipoises. This linear, molding grade polystyrene is sold by Koppers Co. under the name KTPL-4 | 25 |
| Methylene chloride (volatile liquid carrier) | 70 |
| | 100 |

The 100 gms. of solution was then spread uniformly with a spatula on one side of a glass cloth (sheet-type matrix) 500 square inches in area. The glass cloth, which was made from textile strands of glass filaments, weighed one ounce per square foot. The cloth is known in the industry as Boat type A and is made by the Coast Manufacturing Company. The solution penetrated throughout the glass cloth, and it was allowed to dry overnight at room temperature. During this period, the methylene chloride evaporated leaving a film of polystyrene binder containing the benzoyl peroxide catalyst impregnated on the glass cloth matrix. The film of binder and catalyst caused the glass cloth to stiffen somewhat, but it remained flexible enough to bend and roll readily.

After the impregnated glass cloth matrix had been stored for two days under atmospheric conditions, 495 gms. of liquid polyester polymerizable material composed of a condensate of a mixture of 1.1 mole propylene glycol with 0.5 mole phthalic anhydride and 0.5 mole maleic anhydride diluted with styrene in the ratio of 65 parts polyester to 35 parts of styrene, was mixed with 5 gms. of dimethylaniline as an accelerator. The entire amount of the liquid polyester and accelerator mixture was then uniformly spread on the one surface of the previously impregnated glass cloth and it penetrated throughout the cloth. Within ten minutes after contact with the glass cloth matrix the polyester polymerized to a thick gel without application of heat. A hard nontacky reenforced resinous product was obtained in 20 minutes at room temperature.

*Example 2*

The following compounds were mixed to form a volatile liquid carrier containing a catalyst and a film forming binder uniformly distributed in the carrier:

| | Gms. |
|---|---|
| Benzoyl peroxide (catalyst) | 5 |
| Polystyrene beads (binder) (same as Example 1) | 5 |
| Methylene chloride (volatile liquid carrier) | 90 |
| | 100 |

Forty grams of this solution was then sprayed evenly over the entire surface area of one side of a glass cloth matrix of the type employed in Example 1 that was preformed on an inverted 1000 ml. Griffin-form glass beaker. The solution penetrated throughout the glass cloth, and the methylene chloride carrier rapidly evaporated leaving a film of binder and benzoyl peroxide catalyst on the matrix.

After 24 hours on the mold at room temperature, the formed matrix while it remained on the mold was brushed uniformly on the outer side with 100 gms. of the same liquid polyester polymerizable material employed in Example 1. The liquid polyester penetrated throughout the glass cloth matrix, after which the impregnated matrix was then placed in an oven while still supported by the mold, and heated at 80° C. or one-half hour. The polyester completely cured to form a solid reenforced resinous article in the shape of the beaker mold, and the solid resinous article was readily removed from the beaker.

*Example 3*

A solution for impregnating a sheet-type matrix with catalyst was prepared by dissolving 3.5 gms. of benzoyl peroxide catalyst in 96.5 gms. of benzene carrier. The entire solution was sprayed uniformly on one side of a flat piece of conventional cotton bed sheeting 15 inches x 20 inches.

After the benzene carrier evaporated, the impregnated cloth matrix was dipped and held for about 10 seconds in a commercial unsaturated liquid polyester polymerizable material composed of a condensate of 1.1 moles of ethylene glycol, 0.8 mole maleic anhydride and 0.2 mole of phthalic anhydride diluted with styrene in the ratio of 70 parts of polyester to 30 parts of styrene to which 0.02 percent of dibutyl tin dilaurate accelerator had been added. Upon removal from the liquid polyester solution, gelation of the polyester polymerizable material occurred at room temperatures in 15 minutes, and the polyester hardened overnight at room temperature to form a solid reenforced product.

Example 4

A solution of a liquid catalyst and a film forming binder in a volatile liquid carrier was formed by mixing the following in a glass flask:

| | Gms. |
|---|---|
| Methyl ethyl ketone peroxide (60% solution in dimethyl phthalate) (catalyst) | 5 |
| Paraffin wax (film-forming binder) | 10 |
| Methylene chloride (volatile liquid carrier) | 92 |
| | 107 |

100 gms. of the above solution of catalyst and binder in methylene chloride was brushed onto one side of a flat piece of glass fiber mat 20 x 25 inches. The mat weighed 1½ ounces per square foot, and is the type designated in the industry as Owens Corning Treatment #16. It is composed of strands of textile type drawn glass filaments disposed at various angles to each other and bound by a polyester binder. The thickness varied throughout the same mat from $\frac{1}{32}$ to $\frac{1}{8}$ inch. The solution penetrated throughout the glass mat, and the methylene chloride evaporated leaving deposited on the matrix a solid coating of the methyl ethyl ketone peroxide catalyst (normally a liquid at room temperature) immobilized in the wax binder.

The impregnated matrix was stored at room temperature for 15 days. The matrix was then dipped for 10 seconds in 300 gms. of a solution of the unsaturated liquid polyester polymerizable material employed in Example 3 which had previously been mixed with 18 grams of a 6 percent solution of cobalt naphthenate accelerator in mineral spirits. The polyester cured at room temperature to form a solid reenforced article in 45 minutes.

Example 5

A volatile liquid carrier containing a catalyst and a binder was prepared by mixing the following components:

| | Gms. |
|---|---|
| Cyclohexanone hydroperoxide (catalyst) | 18 |
| Polyvinyl chloride (binder) | 15 |
| Methylene chloride (volatile liquid carrier) | 120 |
| Benzene (volatile liquid carrier) | 147 |
| | 300 |

A rectangular piece of glass fiber cloth matrix of the type employed in Example 1, about 30 inches x 10 inches in area, was covered evenly throughout with a thin layer of about 100 gms. of this solution of catalyst and binder in the combined volatile liquid carrier by drawing the glass fiber cloth through the solution in a shallow trough. After the solvent evaporated, the impregnated glass fiber matrix was cut into three equal 10 inch x 10 inch squares. The first square of the matrix was utilized to form a reenforced synthetic sheet on the same day that the matrix was impregnated with the solution of catalyst and binder. This was accomplished by spreading on one side of the matrix about 150 grams of the unsaturated liquid polyester polymerizable material employed in Example 3 to which had been added 9 grams of a 6 percent solution of cobalt naphthenate accelerator in mineral spirits. The polymerizable material penetrated throughout the glass cloth matrix. The second and third squares of glass cloth were impregnated with the same liquid polystyrene mixture is exactly the same manner as the first piece of the matrix, after they had been stored for one week and two months, resepctively. With all three squares of impregnated matrix, regardless of the storage time, the polyester gelled in about 20 minutes at room temperature. Also, all the squares of impregnated matrix formed a solid, hard reenforced resinous sheet upon curing overnight.

Example 6

A homogeneous mixture of accelerator and binder in a volatile liquid carrier was prepared by mixing the following in a glass flask:

| | Gms. |
|---|---|
| Dimethyl aniline (accelerator) | 4 |
| Polystyrene beads (polymerized styrene) (binder). The viscosity of a 30% test solution of the polystyrene in toluene at 25° is 242 centipoises. This linear molding grade polystyrene is sold by Koppers Co. under the name KTPL-6 | 6 |
| Methylene chloride (volatile liquid carrier) | 90 |
| | 100 |

100 gms. of the above solution was applied to one side of a 500 square inch rectangular matrix of glass fiber cloth of the type employed in Example 1, and the solution penetrated throughout the cloth. After a period of one hour when the solvent had evaporated, and the film of binder and accelerator had been formed on the glass cloth matrix, the matrix was sprayed on both sides with a solution of following components:

| | Gms. |
|---|---|
| Benzoyl peroxide (catalyst) | 5 |
| Polystyrene beads (binder) (same as in Example 1) | 8 |
| Ethylene dichloride (volatile liquid carrier) | 87 |
| | 100 |

The solution of benzoyl peroxide catalyst and polystyrene binder impregnated the matrix, and dried within 15 minutes to form a second film on the matrix after evaporation of the volatile liquid carrier.

The impregnated glass fiber mat was stored for 48 hours after which 500 gms. of an unsaturated polyester composed of a condensate of 1.1 moles of propylene glycol, 0.6 mole fumaric acid, 0.3 mole maleic anhydride and 0.1 mole of phthalic anhydride, and containing monomeric methyl methacrylate as a cross linking agent in the ratio of 65 parts polyester to 35 parts monomer, was applied to one side of the matrix by employing a brush dipped in the polyester solution, and the polyester penetrated throughout the matrix. Both layers of the polystyrene binder were dissolved by the polyester liquid polymerizable material resulting in contact between the polyester, the benzoyl peroxide catalyst, and the dimethyl aniline accelerator. The liquid polyester polymerizable material gelled in about 30 minutes, and formed a hard resinous sheet upon standing overnight.

Example 7

A colloidal dispersion of a liquid catalyst and a film-forming binder in a volatile liquid carrier was prepared by mixing the following in a glass beaker:

| | Gms. |
|---|---|
| Diethylene triamine (catalyst) | 25 |
| Finely divided silica gel (binder) | 3 |
| Acetone (volatile liquid carrier) | 22 |
| | 50 |

This viscous slightly cloudy dispersion (50 grams) was then spread, with the aid of a glass rod, over both sides of a rectangular piece of glass fiber mat having the dimensions 8 inches x 10 inches. The glass mat was the same type of mat that was employed in Example 3. The acetone was allowed to evaporate leaving a mat which was impregnated with the diethylene triamine catalyst (normally a liquid at room temperature) immobilized in a film of silica gel binder.

The impregnated matrix was kept at room temperature for 24 hours after which 75 grams of an epoxy resin condensate of bisphenol and epichlorohydrin having a viscosity at 25° C. of about 110 poises and an epoxide equivalent of about 200 (Epon 828, manufactured by Shell Chemical Corporation) was poured over one surface of the matrix and spread evenly with the aid of a glass rod as it penetrated throughout the matrix. The matrix containing the immobilized layer of catalyst, and the liquid epoxy resin was then placed in an oven at 60° C. After 4 hours it was removed, and the resin was found to be gelled, hard and non-tacky.

We claim:

1. Process for coating surfaces with unsautrated polyesters which comprises coating the surface with a solvent containing lacquer capable of drying by solvent evaporation and containing a peroxide catalyst capable of hardening a solution containing an unsaturated polyester dissolved in a polymerizable monomer, evaporating the solvent from said surface, thereafter applying a coating of an unsaturated polyester dissolved in a polymerizable monomer and allowing said coating to set by action of said catalyst.

2. Process according to claim 1 in which said lacquer contains peroxide groups acting as said catalyst.

3. Process according to claim 1 in which said solution of an unsaturated polyester in a polymerizable monomer contains an accelerator.

4. Process according to claim 1 in which said lacquer contains a synthetic resin.

5. Process for coating surfaces with unsaturated polyesters which comprises coating the surface with a volatile liquid carrier capable of drying by evaporation, and containing a film forming binder and a polymerization catalyst capable of hardening a solution containing an unsaturated polyester dissolved in a polymerizable monomer, evaporating the liquid from said surface, thereafter applying a coating of an unsaturated polyester dissolved in a polymerizable monomer and allowing said coating to set by action of said catalyst.

6. In the manufacture of a substantially solid porous mat-like matrix reenforced by a set unsaturated polyester dissolved in a polymerizable monomer; the method of preparing the matrix beforehand which comprises impregnating the same with a volatile liquid carrier capable of drying by evaporation, and containing a film forming binder and a polymerization catalyst capable of hardening a solution containing such unsaturated polyester dissolved in a polymerizable monomer, and allowing said liquid carrier to evaporate from said matrix to cause said binder to adhesively bond said catalyst to said matrix and protect the same; such protective binder being unreactive with said catalyst whereby upon subsequent application of such solution of unsaturated polyester dissolved in a polymerizable monomer, the solution sets by action of the catalyst.

7. As an article of manufacture, a storable porous mat-like reenforcing matrix; and a polymerization catalyst on said matrix capable of hardening a solution containing an unsaturated polyester dissolved in a polymerizable monomer, said catalyst being protected by and adhesively bonded to said matrix by a film forming binder which is unreactive with said catalyst and is soluble in such solution of unsaturated polyester dissolved in a polymerizable monomer; whereby when said solution is subsequently applied it sets by action of said catalyst.

References Cited by the Examiner
UNITED STATES PATENTS

| | | | |
|---|---|---|---|
| 1,111,286 | 9/1914 | Aylsworth | 117—1 |
| 2,270,285 | 1/1942 | Frolich | 117—1 |
| 2,484,215 | 10/1949 | Foster. | |
| 2,491,409 | 12/1949 | Kropa et al. | 117—126 |

FOREIGN PATENTS 435,041   9/1935   Great Britain.

OTHER REFERENCES

Landells: Journal Soc. Dyers and Colorists, vol. 67, pp. 338–340, 1951.

RICHARD D. NEVIUS, *Primary Examiner.*

JOSEPH B. SPENCER, *Examiner.*